Patented Jan. 22, 1952

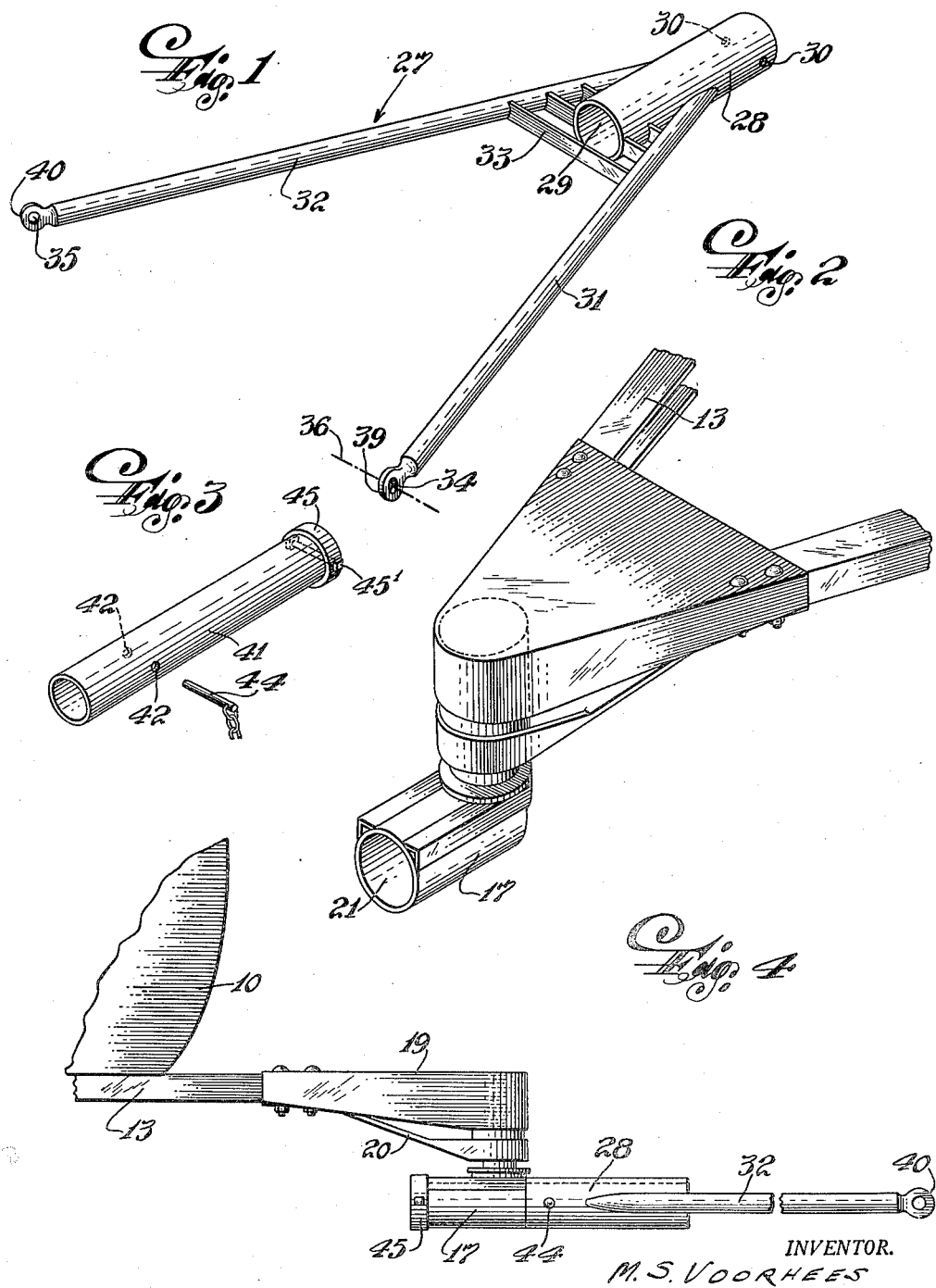

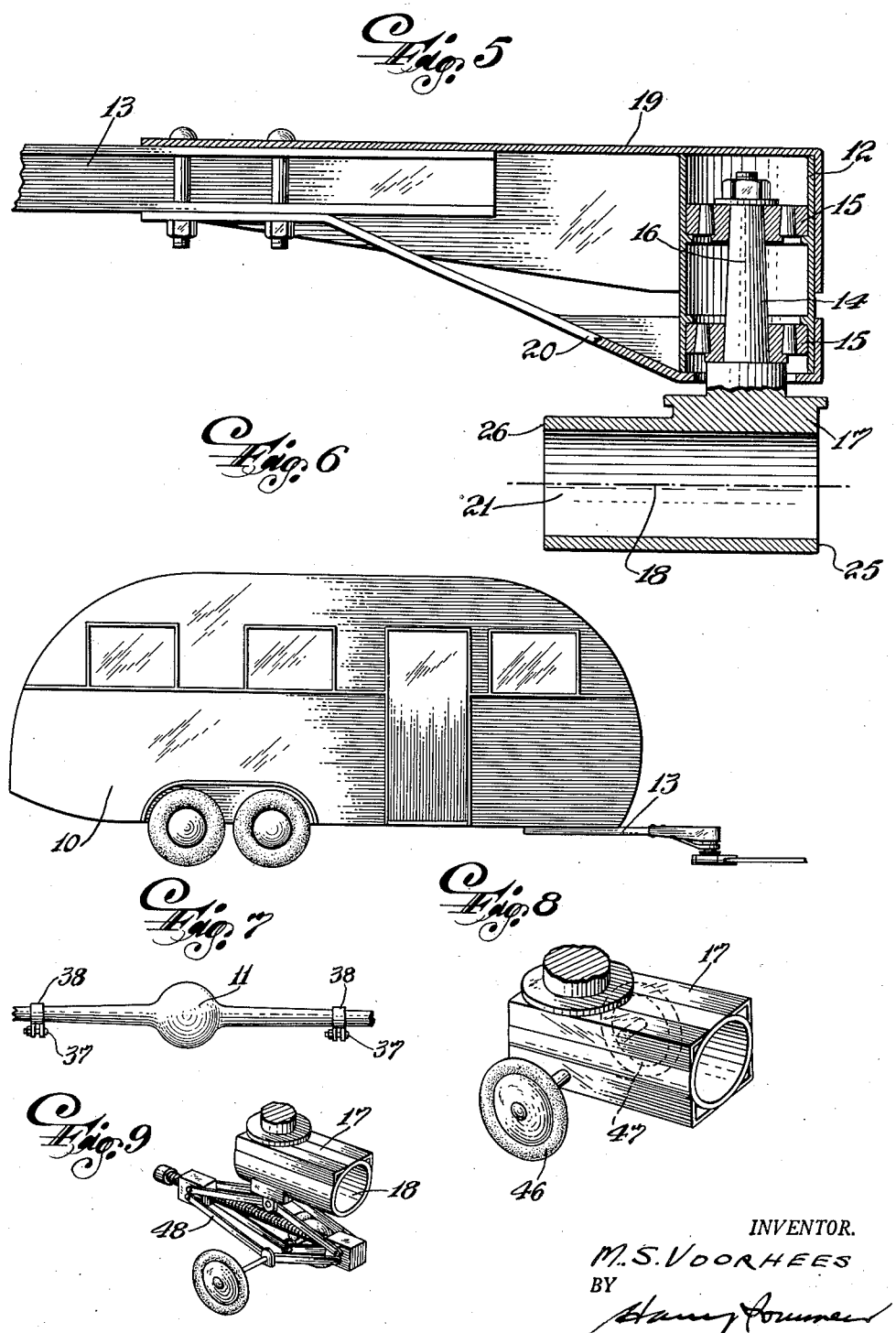

2,583,191

UNITED STATES PATENT OFFICE 2,583,191

TRAILER COUPLER

Milton S. Voorhees, Point Pleasant Beach, N. J.

Application November 4, 1949, Serial No. 125,473

3 Claims. (Cl. 280—33.15)

This invention relates to trailer couplers, and more particularly to such couplers used for connecting a trailer to an automobile to tow the same.

The trailer coupler embodying my invention is adapted to be readily secured to and disconnected from the trailer and towing automobile in a convenient manner.

The coupler incorporates features of novel construction which facilitate the manufacture, use and assembly thereof, and permit the towing auto and trailer to sway responsive to wind pressure and road irregularities, independently.

These and other advantageous objects, which will appear from the drawings, and from the description hereinafter, are accomplished by the structure of my invention, of which embodiments are illustrated in the drawings. It will be apparent, from a consideration of said drawings, and the following description, that the invention may be embodied in other forms suggested thereby, and such other forms as come within the scope of the appended claims, are to be considered within the scope and purview of the instant invention.

In the drawings:

Fig. 1 is a perspective view of a tracking unit embodying my invention,

Fig. 2 is a fragmentary perspective view of a coupler housing for said unit, shown secured to the frame of the trailer unit, Fig. 3 is a perspective view of an alignment sleeve used in carrying out the invention, Fig. 4 is a fragmentary, elevational, view of the end of a trailer to which the coupler is shown secured, Fig. 5 is a fragmentary, vertical, elevational view of the trailer frame and the coupler housing secured thereto, Fig. 6 is an elevational view of a trailer unit to which the coupler of the invention (shown fragmentarily) is secured, Fig. 7 is an elevational view of the rear axle of a towing automobile, showing brackets fixed thereto for connection with the tracking unit of Fig. 1, Fig. 8 is a fragmentary, perspective view of the tube member which is connected to the housing coupler shown in a modified form, wherein the same is provided with dolly wheels, and Fig. 9 is a similar view of another modified form thereof, wherein an expansion jack unit is connected to the lower end of the coupler housing tube, dolly wheels being carried by the lower end of the jack.

In the drawings, the invention is shown applied to the trailer unit 10, by way of example, it being understood that the invention is equally applicable for use in connection with any other type or style of trailer unit, for connecting the same to the axle 11 of a towing automobile. The coupler comprises a housing 12 secured to the frame 13 of the trailer unit, a stub shaft 14 being positioned in said housing and rotating therein on anti-friction means 15 or the like. The stub shaft is secured in the housing against accidental displacement therefrom and rotates therein on its axis 16. A tube 17 is fixed to the lower end of the stub shaft 14 and at right angles to axis 16 thereof, said tube having a circular bore 21 therethrough in a plane 18 at right angles to axial plane 16 of stub shaft 14. Frame elements 19, 20 engage the housing 12 at one end and are connected to the trailer frame 13 at the other end, to connect the housing to the frame.

The end 25 of the tube is aligned with the end of the housing 12, the other end 26 of the tube extending substantially past the same for a purpose presently explained. The Y-shaped tracking unit 27 of the invention (see Fig. 1) comprises a centering shell 28 having an axial bore 29 therethrough and transverse aperture 30 intersecting said bore. A pair of elongated track arms 31, 32 is connected at its inner end to the shell 28. The tracking unit 27 may be provided with one or more transverse strengthening bars 33. The other ends 34, 35 of the arms 31, 32 have apertures opening in a horizontal plane 36 for reception of the pivot elements 37 (Fig. 7) of brackets 38 fixed to the axle 11, to thus pivotally connect the free radial ends 39, 40 of the arms 31, 32 to said axle, so that unit 27 will track the path of the towing auto. An elongated alignment sleeve 41 (Fig. 3) is provided with transverse apertures 42, so that when said alignment sleeve is fully inserted through tube 17 and into the centering shell 28, (Fig. 4) the apertures 42 and 30 will register to receive a bolt 44 or the like to connect the sleeve 41 to the shell 28.

In operation, track unit 27 is connected to the axle 11 of the towing auto, and the latter is backed up to align the centering shell 28 with the tube 17. Then alignment sleeve 41 is inserted through the tube 17 and into the centering shell 28. Bolt 44 is passed through apertures 30 and 42, the end stop 45 being secured, as by bolt 45' or the like, to the alignment sleeve 41. It will be appreciated that the said end stop 45 may be in a form other than that of a ring, as shown in Fig. 3, and that it may be a unitary part of sleeve 41. It will likewise be understood that the invention is capable of many modifications other than those illustrated in the accompanying drawings. All such modifications as come within the spirit and scope of the appended claims shall be deemed to be within the purview of the invention.

It has been found, in practise, that the invention above described is admirably adapted for its purpose and that the connection between the trailer and the towing auto is such a smooth one in operation that a glass of water placed on the frame 13 of a trailer, such as the trailer 10, at the beginning of an ordinary trip of many miles will be in position and without loss of water at the end of a trip.

The Y-shaped tracking unit assures accurate and automatic tracking of the towing auto by the trailer. If desired, dolly wheels 46, 47 may be fixed to stub shafts extending from the tube 17 (Fig. 8) or may be carried by the lower end of an expansion jack 48, the upper end of the jack being secured to the tube 17 (Fig. 9). By the arrangement just mentioned, the end of the trailer from which the frame 13 extends may be jacked up in a convenient manner where that may be desired for any reason. Conventional trailer couplers are secured to the bumper of the towing automobile, with the result that all body movements of the towing automobile are transmitted directly to the coupler, including swaying of the body; the coupler, by like token, will transmit much of its movement to the towing automobile body. Moreover, the conventional coupler uses exposed parts which are unsightly, protruding from the rear bumper and end of the body. The instant invention obviates these disadvantages and further provides a convenient means for permanently readying a number of automobiles in a family for coupling to the trailing unit at will by securing to each auto one of the tracking units 27. The centering shell 28 may be held in position beneath the towing auto to which the unit 27 is secured by chains, springs, or similar means.

Having thus described my invention, what I claim as new and desire to secure by Letters Patent is:

1. In a trailer coupler for coupling a trailer unit to a towing vehicle, a housing adapted to be secured to the trailer in fixed vertical position, a stub shaft, means engaging the housing and shaft to secure the latter in the former against axial displacement for rotation of the shaft on its axis, a tube fixed to the lower end of the shaft in a plane at right angles to the longitudinal axis of the shaft, one end of the tube being in vertical alignment with the corresponding end of the housing, the other end of the tube extending substantially past the housing, a V-shaped tracking unit comprising a centering shell having an axial bore and having a transverse aperture intersecting said bore, a pair of track arms fixed at one end to the shell, the other ends of said arms having apertures opening in a horizontal plane to receive pivot elements to secure the arms to the axle of the vehicle, and thus pivotally connect the free radial ends of the tracking unit to the axle to track the latter, an elongated alignment sleeve adapted to be slidably received in the axial bore of the shell, said sleeve having transverse apertures adapted to register with the transverse apertures of the shell to receive means to secure said shell to the sleeve with a substantial portion projecting therefrom, said projecting portion being adapted to be passed through the tube and to extend therebeyond, an end stop adapted to be positioned on the extended portion of the sleeve and to abut the tube end, and means to secure the stop to the sleeve in that position.

2. In a trailer coupler for coupling a trailer unit to a towing vehicle, a vertically disposed housing adapted to be secured to the trailer, a horizontally disposed tube open at both ends, means connecting the tube to the housing for rotation about a vertical axis, a tracking unit comprising a horizontally disposed shell having an axial bore, arms fixed at one end to the shell and disposed in the same general plane as the shell, the other ends of the arms being adapted to be secured to the towing vehicle, said tube and shell being adapted to be positioned in abutting axial alignment, a sleeve adapted to be positioned in the aligned tube and shell and capable of rotation in the tube, means for keying the sleeve to the shell against independent rotation, and means for securing the sleeve against displacement from the tube.

3. In a trailer coupler for coupling a trailer unit to a towing vehicle, a vertically disposed housing member adapted to be secured to the trailer, a stub shaft mounted for rotation about a vertical axis in the said housing member, the lower end of the stub shaft extending below the bottom of the housing member, a horizontally disposed tube fixedly carried by the lower end of the stub shaft, a tracking unit comprising a horizontally disposed shell, arms fixed at one end to said shell and disposed in the same general plane as the shell, the other ends of the arms being adapted to be secured to the axle of the towing vehicle, said tube and shell being adapted to be positioned in axial alignment, a sleeve keyed to and projecting from one end of the shell and rotatably disposed in said tube, and means for securing the sleeve against displacement from the tube.

MILTON S. VOORHEES.

REFERENCES CITED

The following references are of record in the file of this patent:

UNITED STATES PATENTS

| Number | Name | Date |
|---|---|---|
| 2,187,970 | Greer | Jan. 23, 1940 |
| 2,496,515 | Bayes | Feb. 7, 1950 |